J. DEMAREST.
WATER-CLOSETS.
No. 195,705. Patented Oct. 2, 1877.
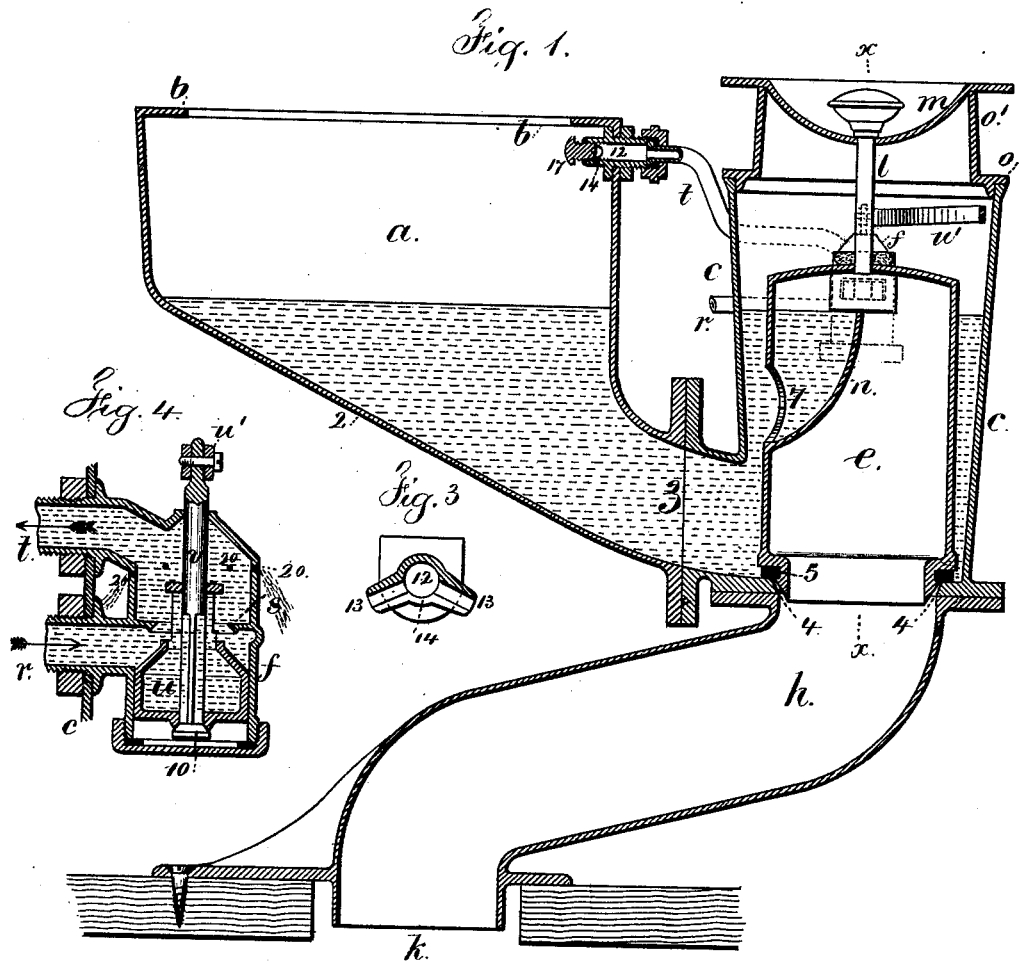
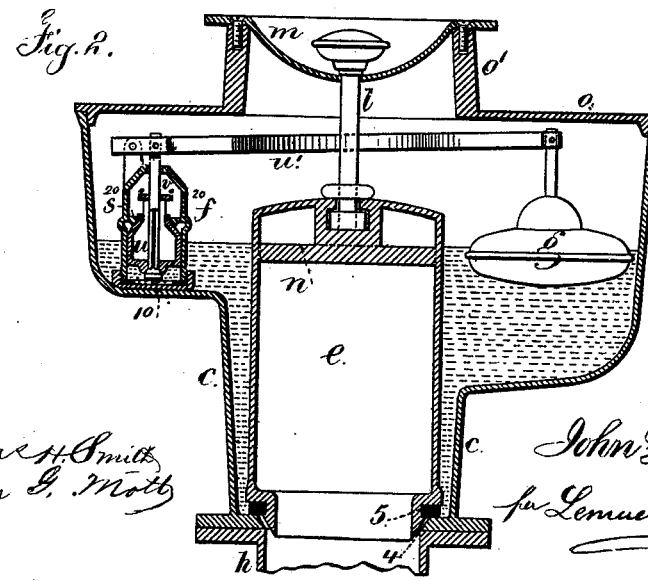
Witnesses
Chas. H. Smith
William G. Mott
Inventor
John Demarest
for Lemuel W. Serrell
Atty

UNITED STATES PATENT OFFICE.

JOHN DEMAREST, OF NEW YORK, N. Y.

IMPROVEMENT IN WATER-CLOSETS.

Specification forming part of Letters Patent No. 195,705, dated October 2, 1877; application filed August 20, 1877.

*To all whom it may concern:*

Be it known that I, JOHN DEMAREST, of the city and State of New York, have invented an Improvement in Water-Closets, of which the following is a specification:

The object of this invention is to insure a proper flow of water through the closet; to prevent the accumulation of any offensive matter under circumstances where its odor can pass out into the room; to operate the valve with uniformity regardless of the pressure, and to give easy access to all the parts of the closet for cleaning or repair.

The basin has a lateral opening into the valve-chamber. The discharge-valve is a hollow cylinder closed at the upper end to prevent the escape of odors from the trap, and there is within the cylinder an overflow and trap. The supply-valve is opened and closed according to the level of the water in the basin, so that it becomes self-acting to give the supply or flushing whenever the water-level falls. Hence the basin is always charged ready for use, and can never become accidentally empty.

In the drawing, Figure 1 is a vertical section of the water-closet. Fig. 2 is a section transversely at the line $x$ $x$, and Fig. 3 is a section of the fan for spreading the water that runs into the basin. Fig. 4 is a section of the supply-valve in larger size.

The basin $a$ is of porcelain, porcelain-lined metal, or other material, in about the form represented, with an inward flange, $b$, at the top, and with the bottom 2 inclined to the opening 3, leading into the valve-chamber. This valve-chamber is made of a cylinder, $c$, having a side opening communicating with the opening 3, and a valve-seat at 4. The upper part of the valve-chamber is enlarged to contain the supply-valve $f$ and the float $g$.

At the bottom of the valve-chamber is the pipe $h$, communicating to the trap or sewer-pipe at $k$. It is generally preferable to use this pipe $h$, that extends to a point centrally below the basin $a$, so that this closet may be applied to the trap or sewer-pipe provided for an ordinary pan-closet; but the pipe $k$ may be vertical, and pass from the valve-seat 4 to an ordinary trap in the sewer-pipe.

The discharge-valve is made as a cylinder, $e$, with an elastic surface, 5, near its lower edge, to rest upon the seat 4, and the upper end of this cylinder $e$ is closed, and provided with a rod, $l$, that passes up through the cup $m$, and terminates as a handle, by means of which the valve-cylinder $e$ can be lifted from its seat 4, to allow the contents of the pan to escape laterally and pass down through the pipe $h$.

When this valve-cylinder is dropped, it closes the pipe $h$ by resting upon the seat, and the water supplied into the pan accumulates and rises in the pan and around the cylinder $e$; and I provide an overflow-trap in this cylinder $e$, instead of the upper end of such cylinder being open, as heretofore made use of. This overflow-trap is made by the dam $n$ within the cylinder $e$, the upper edge of which is at the height required for the water in the basin $a$, and there is an opening, 7, in the side of the cylinder $e$, that is lower than the top of the dam $n$. Hence the accumulation of water causes it to rise above this opening, and thereby exclude smell from passing out of the trap or sewer-pipe. At the same time any surplus water is free to flow over the edge of the dam.

There is a cover, $o$, to the valve-chamber $c$, and the central portion of that cover is made as a cylinder, $o'$, that is large enough for the valve-cylinder $e$ to pass through it. Hence this cylinder $e$ can be lifted out, whenever desired, either for cleaning or repairing the valve and the other parts, or for giving access to the valve-seat and chamber for cleaning. The socket for the pull is preferably screwed to the upper end of this cylindrical opening $o'$, and can be removed therefrom, so that the wood-work is not disturbed for cleaning or repairs.

The cylinder $f$ of the supply-valve has an inlet-pipe, $r$, below the seat $s$ and the outlet-pipe $t$ to the basin above said seat. Below this seat is a hollow main valve, $u$, fitting loosely into the cylinder $f$, and its upper conical surface forms the valve that closes against the seat $s$. A spindle, $v$, passes through the top of the cylinder $f$, down through the main valve $u$, and its lower end forms an auxiliary valve, 10. The upper end of this spindle $v$ is connected with the lever $u'$ and its float $g$.

The operation of the valve is such that when the water in the pan and valve-chamber falls the float descends, and, by its lever, forces down the spindle $v$, opening the auxiliary valve 10, and allowing the water under pressure beneath the main valve $u$ to escape upwardly through that valve, and hence this main valve $u$ is unsupported, and drops from its seat $s$, and allows the water to pass freely to the pan. When the float rises it closes the small or auxiliary valve 10, and also tends to lift the main valve $u$, and the water passing into the chamber below the main valve $u$ lifts the same against the seat, effectually closing the passage of water into the pan, and thus it remains until the float again falls.

In the basin there is a spreader to direct the water in flushing the closet. This spreader is at the end of the water-supply pipe, and is formed as a tube, 12, with lateral branches 13, and a slot at 14. This slot 14 directs a fan of water downward, and the tubes 13 direct the water laterally and slightly downwardly, so that they strike upon and follow the interior surface of the basin $a$ around toward the front, and wash the same thoroughly. The screw 17 serves to lessen or increase the water-space at the junction of the tubes, and regulate the quantity issuing from the jet-tubes 13.

In order to cleanse the interior of the valve-chamber and prevent the possibility of smell from the same, I perforate the upper part of the valve-case $f$ with holes, as at 20, so that jets of water issue from the same in different directions against the interior surfaces of the valve-chamber.

I claim as my invention—

1. The combination, with the basin $a$ and valve-chamber $e$, of the hollow cylindrical discharge-valve, closed at the top, and provided with a dam and an overflow-opening, substantially as set forth.

2. The water-supply valve made with a cylindrical main valve, $u$, fitting loosely the case $f$, and closing upwardly, and an auxiliary valve closing an opening through the main valve, substantially as set forth.

3. The valve-cylinder $f$, within the chamber containing the cylindrical valve $e$, and provided with holes in said case $f$ for jets of water to cleanse the interior of the said chamber, substantially as set forth.

4. The spreader made of the tubes 12 and 13, and having a slit, 14, and provided with the adjusting-screw 17, substantially as set forth.

Signed by me this 13th day of August, A.D. 1877.

JOHN DEMAREST.

Witnesses:
S. G. VAN DEUSEN,
E. CLINTON SMITH.